(12) United States Patent
Delmoro et al.

(10) Patent No.: US 6,439,042 B1
(45) Date of Patent: Aug. 27, 2002

(54) MARKER POSITIONER

(75) Inventors: Richard L. Delmoro, Tallmadge; Dave Krause, Hartville, both of OH (US)

(73) Assignee: Akron Special Machinery, Inc., Akron, OH (US)

( * ) Notice: Subject to any disclaimer, the term of this patent is extended or adjusted under 35 U.S.C. 154(b) by 0 days.

(21) Appl. No.: 09/639,167

(22) Filed: Aug. 16, 2000

(51) Int. Cl.[7] .............................................. G01M 17/02
(52) U.S. Cl. ...................................................... 73/146
(58) Field of Search ...................... 73/146, 460, 146.2, 73/459, 471, 462

(56) References Cited

U.S. PATENT DOCUMENTS

| | | | |
|---|---|---|---|
| 4,997,994 A | * 3/1991 | Andrews et al. | 174/112 |
| 5,355,728 A | * 10/1994 | Hartmann, Jr. | 73/460 |
| 5,789,668 A | * 8/1998 | Coe et al. | 73/146 |
| 6,113,678 A | * 9/2000 | Malhotra | 106/31.29 |
| 6,269,689 B1 | * 8/2001 | Alexander | 73/146 |

OTHER PUBLICATIONS

Manual and Motorized Positioning Systems, Catalog 000–9132–01 Parker Motion and Control DAEDAL pp. B1–B88 (1996 Parker–Hanafin Corp.).

40200LN Series Linear Positioning Tables New . . . with Ballscrew Drive, Catalog 000–9134–01 Parker Motion and Control DAEDAL.

400XR Series Linear Postitioning Tables, Catalog 000–9141–02 Parker Automation.

406LXR Series Linear Motor Driven Tables, Catalog 9143/USA, Parker Automation.

Modular Automation Systems, Catalog 2042/USA, Parker Automation.

* cited by examiner

Primary Examiner—Benjamin R. Fuller
Assistant Examiner—Jewel V. Thompson
(74) Attorney, Agent, or Firm—Reese Taylor

(57) ABSTRACT

A tire uniformity machine for analyzing a tire having a process controller in communication with a plurality of sensors for determining the physical characteristics of the tire, the marking assembly comprising a positioning assembly near the tire uniformity machine and in communication with the process controller; a marker operatively attached to the positioning assembly such that upon receiving a signal from the process controller the positioning assembly locates the marker in operative relation to the tire.

14 Claims, 4 Drawing Sheets

MARKER POSITIONER

RELATED PATENT APPLICATIONS

None.

FIELD OF THE INVENTION

The present invention generally relates to tire uniformity machines. More particularly, the present invention relates to a marking mechanism for a tire uniformity machine. Most specifically, the present invention relates to a marker that is automatically positioned for application of a mark on a tire in a continuous process.

BACKGROUND OF THE INVENTION

Tire uniformity machines may be used to detect the high or low point of fundamental harmonic of radial force variation within the tire. When measuring the tire force variations, a computer analyses of the high or low point phase angle of the radial force variation first harmonic from an event mark (zero angle). The event mark is set on the tire spindle shaft in conjunction with a pulse generator and pulses once per revolution. After measurement is complete, the tire rotation speed is accelerated, the high or low point of the tire is indexed and stopped beneath a marker head. A heated marking pin is lowered against the upper side wall of the inflated tire by actuation of an air cylinder. The heated pin transfer pigment or metal foil from a tape to place a mark on the sidewalls of the tire at the high or low point.

While the mark is automatically applied by actuation of the pneumatic cylinder, the position of the marking apparatus must be manually adjusted for each tire cross section and diameter. In other words, for tires of different diameters or cross section, the marking apparatus must be manually moved vertically or horizontally to accommodate the change in tire size.

While this manual adjustment is suitable for batch operating systems, tire production increasingly relies on continuous production of tires of varying sizes. Consequently, there is a need for a marking apparatus that can automatically adjust to accommodate changes in tire size as the tires come through the uniformity machine.

SUMMARY OF THE INVENTION

It is, therefore, an object of the present invention to provide a marking assembly in a tire uniformity machine that is capable of automatically adjusting to accommodate tires of various size.

In furtherance of this object, the present invention provides a marking assembly, in a tire uniformity machine for analyzing a tire having a process controller in communication with a plurality of sensors for determining the physical characteristics of the tire, the marking assembly comprising a positioning assembly in communication with the process controller; a marker operatively attached to the positioning assembly such that upon receiving a signal from the process controller the positioning assembly locates the marker in operative relation to the tire and causes the marker to apply a mark to the tire.

The present invention further provides a marking assembly, in a tire uniformity machine having a process controller wherein the machine receives a test tire, the marking assembly comprising a positioning assembly near the uniformity; and a first marker operatively located with respect to the tire and a second marker opposite the first marker in similar relation to the tire, whereby upon receiving a signal from the process controller, the positioning assembly locates the first and second markers on either side of the tire for applying a pair of marks thereto.

The present invention further provides a method of automatically marking a tire, in a tire uniformity machine that receives test tires and determines their physical characteristics including the tire diameter and axial height, a method comprising providing the tire diameter and axial height to a process controller which causes a marker to move relative to the tire upon determining a change in the tire size and signaling the marker to apply a mark to the tire once the marker is in position.

DETAILED DESCRIPTION OF THE INVENTION

Figure 2:
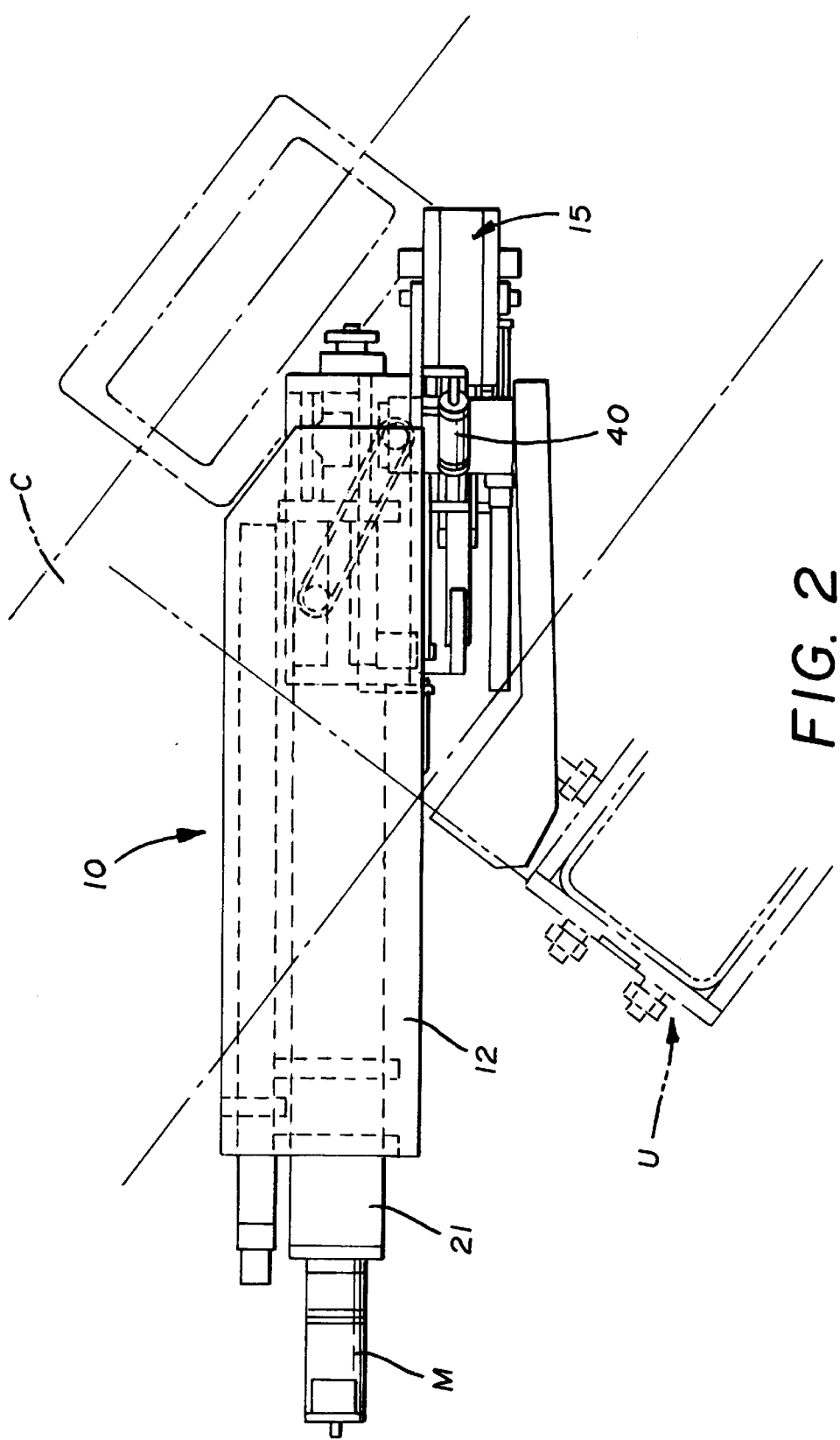
FIG. 2 is a fragmented top elevational view as might be seen along line 2—2 in FIG. 1.

A marking assembly according to the present invention is referred to generally by the numeral 10 in the accompanying drawings. In FIG. 2, marking assembly 10 is depicted as it might be found in a tire uniformity machine U. These machines are well known in the art and, therefore, the discussion of the tire uniformity machine will be made in general terms only. A typical tire uniformity machine may have a plurality of frame elements on which various testing and shaping equipment are mounted. A conveyor C or other transport mechanism brings a tire T into the uniformity machine for testing. Often tire T is chucked and placed in contact with a load wheel. The load wheel is equipped with various sensors to obtain information about the tire, including the tire's dimensions, as it causes the tire to rotate. In some instances, grinding elements are used to correct irregularities found during this testing. Once the testing is complete an event mark is applied to the tire by marking assembly 10. To that end, marking assembly 10 generally includes a marker 15 and a positioning assembly 20.

Marking assembly 10 may be located proximate to the tire T, during testing, or it may be moved into position when the testing is completed. Similarly, the marking assembly may be attached to the uniformity machine U or mounted on its own frame. The marking assembly 10 may be globally positioned according to practices common in the art. With respect to the tire T the marking assembly 10 is selectively moveable to accommodate tires T of various size. In a continuous process tires T of differing sizes may arrive at the marking assembly 10. To accommodate the changes in tire size including diameter and axial height, the marking assembly 10 is moved in an automated fashion.

Figure 1:
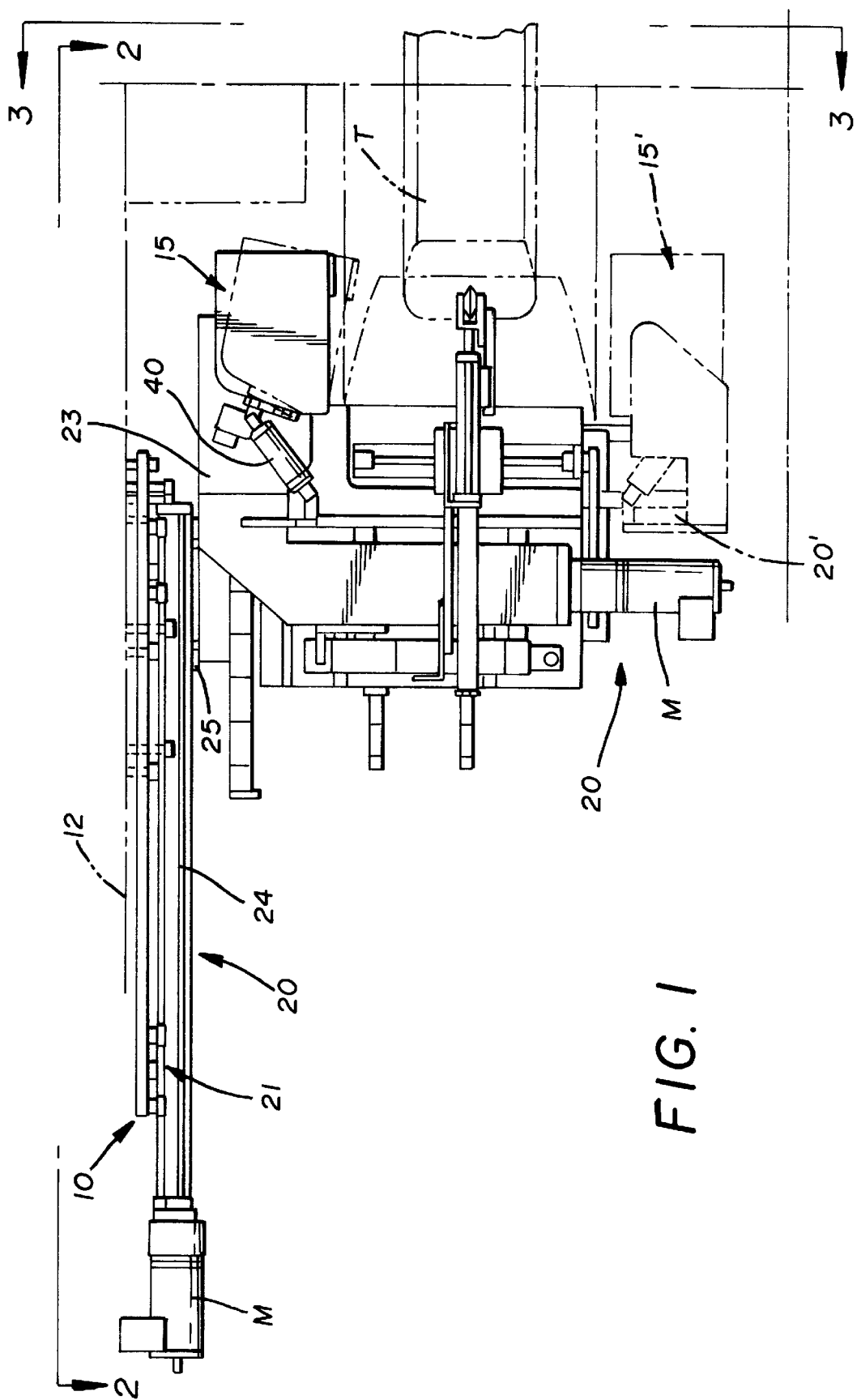
FIG. 1 is a fragmented side elevational view of a marking apparatus according to the present invention showing the marking apparatus as it might be located within a tire uniformity machine in relation to the test tire.

As shown in FIG. 1, marker 15 within marking assembly 10 may be moved horizontally to accommodate tire diameter and vertically to accommodate the tire's axial height.

Figure 3:
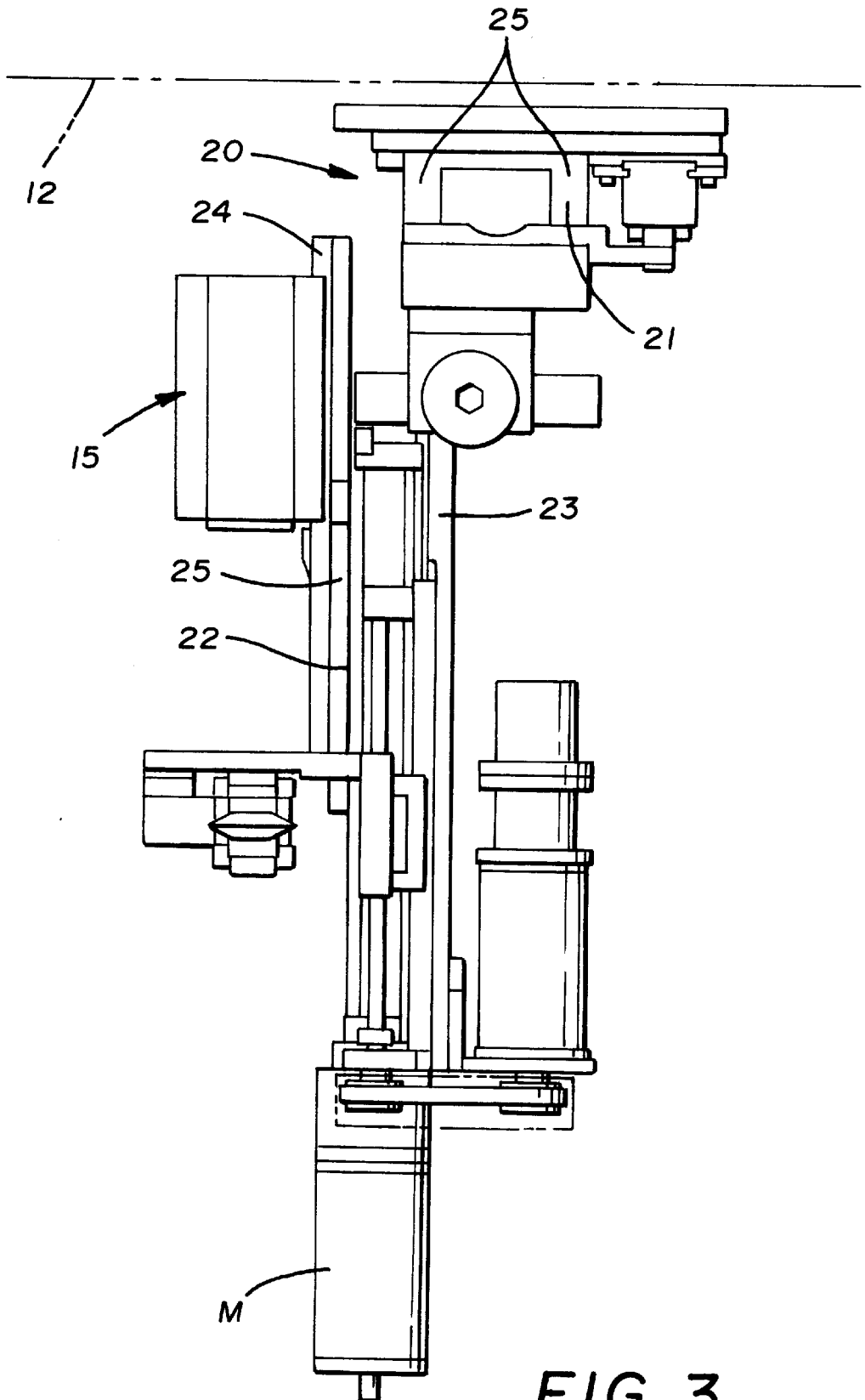
FIG. 3 is a side elevational view as might be seen along line 3—3 in FIG. 1.

The movement of marker 15 may be accomplished with a variety of known positioning assemblies 20 including belt drive systems, stepper motor systems, or linear tables among others. As shown in FIG. 1, the positioning assembly 20 may be mounted on a frame 12 (shown schematically). As previously discussed, the positioning assembly 20 may include a variety of actuators for moving the marker 15 in relation to a tire T. One positioning assembly 20, shown in FIG. 3, includes a first actuator 21 and a second actuator 22 in operative relation with marker 15. Referring to FIG. 1, second actuator 22 may be attached to a frame 23. Frame 23 is, in turn, operatively attached to first actuator 21. Thus, the frame 23 and second actuator 22 may be translated by first actuator 21 along its axis, in this case horizontally. Alternatively, the second actuator 22 may carry the first actuator 21, or independent actuators may be used. Further, it is envisioned that a single actuator having multiple degrees of freedom may be used to position the marker 15. Second actuator 22 moves marker 15 in the vertical direction. As shown, first actuator 21 is oriented horizontally and second actuator 22 is vertical in relation to a tire T carried in a horizontal configuration. It will be appreciated that tire T may be vertically or otherwise oriented within the uniformity machine U and thus actuators 21, 22 may be oriented differently than shown to accommodate the orientation of the tire.

Actuators 21, 22 are shown as linear tables, which are well known in the art, and generally include a motor M operatively engaging a table member 24 which is generally mounted on a pair of rails 25. A wide variety of linear tables are available in the art and include screw drive, stepper motor and servo-motor mechanisms. Some examples of which are shown in *Manual and Motorized Positioning Systems,* catalog 000-9132-01 Parker Motion and Control DAEDAL pp. B1–B88 (1996 Parker-Hanafin Corporation). Other examples are shown in catalog numbers 000-9134-01, 000-9141-02, 9143/USA, and 2042/USA by Parker-Hanafin Corporation. It will be appreciated that if a second marker 15' is used, an additional positioning assembly 20' may be used including separate actuators, or, as shown in phantom, the additional marking assembly 10' may be mounted on a third actuator 22' with both assemblies 10 and 10' being mounted on the first actuator 21. In this way, first actuator 21 positions second actuator and third actuator 22, 22' relative to one dimension of the tire, in this case the diameter, and the second and actuators 22, 22' adjust to the remaining dimension, in this case axial height.

Figure 4:
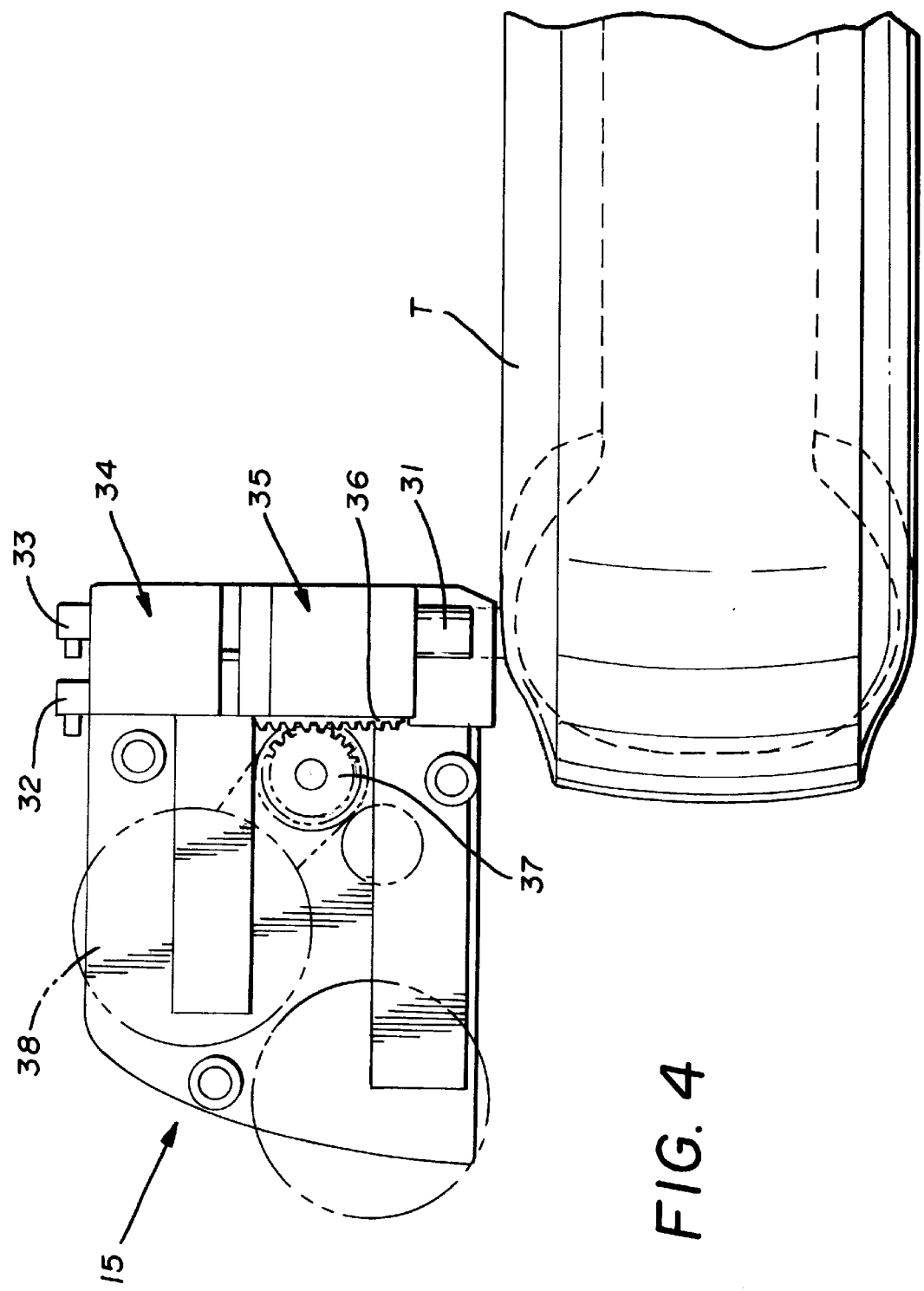
FIG. 4 is an enlarged view of the marking apparatus with the cover removed to show the internal components thereof.

Focusing on the marker 15, a variety of suitable devices capable of applying indicia to a tire's surface including hot stamp markers may be used. One example of which is shown in FIG. 4. In FIG. 4, the cover of a typical hot stamp marker 15 has been removed to show the internal components which include a marking pin 31 and marking tape (not shown). The marking pin 31 is typically driven against the tape by air pressure. Air is provided to the marker 30 by hoses attached to the marker at pneumatic fittings 32, 33 which deliver air to a mark cylinder 34. The mark cylinder 34 drives the pin assembly 35 downward to place a mark and retracts the pin 31 after the mark has been made. A rack gear 36 carried by pin assembly 35 actuates a spur gear 37 which is operatively connected to the tape roll 38 (in phantom), such that the motion of the pin 31 advances the tape. To ensure proper contacting of the marking pin 31, the marker 15 may be rotatably or otherwise moveably mounted on the frame 23, and driven into contact by a fluid cylinder 40 or other means. The contacting means may include a motorized lever arm, a spring or other brasing member, or other conventional mechanism for bringing the marker into contact with the tire. Conversely, the cylinder may be used to retract the marker 15 once the mark has been placed on the tire T. As will be appreciated, the entire marking assembly 10 may be controlled by a suitable process controller (not shown). The process controller may be in communication with suitable sensors for determining the diameter and axial height of the tire transmitting a signal to the controller, which, in turn, adjusts the position of the marking assembly 10 by causing actuation of the positioning assembly 20. Once the marking assembly 10 is in position, the controller may send a signal to activate the cylinder 40 to place the marker 30 near the surface of tire T, and provide air to the pneumatic fittings driving the pin 31 into contact with the tape pressing the tape against the tire to leave a mark. After placing the mark, the controller would retract the marker 30 and await the next tire.

It should thus be apparent that the above-described invention satisfies one or more of the objects stated above. While a full and complete description of the invention has been set forth in accordance with the dictates of the patent statutes, it should be understood that modifications can be resorted to without departing from the spirit hereof or the scope of the appended claims.

What is claimed is:

1. A marking assembly, in a tire uniformity machine, for analyzing a tire, having a process controller in communication with a plurality of sensors for determining the physical characteristics of the tire, the marking assembly comprising:

(a) a marker adapted to selectively apply a mark to the tire at a selected position thereon;

(b) a positioning assembly in communication with the process controller, wherein said marker is supported on said positioning assembly, wherein said positioning assembly is adapted to move said marker to said selected position upon receiving a signal from the process controller and wherein said marker is adapted to apply a mark upon receiving a signal from the process controller; and (c) wherein the position assembly includes a first actuator and a second actuator, wherein the first actuator moves in a plane generally parallel to a radial plane of the tire and the second actuator moves parallel to an axial plane defined by the tire.

2. The marking assembly of claim 1 wherein the actuators are linear tables.

3. The marking assembly of claim 1 wherein the marker is mounted on the second actuator and the second actuator is mounted on the first actuator.

4. A marking assembly, in a tire uniformity machine, for analyzing a tire, having a process controller in communication with a plurality of sensors for determining the physical characteristics of the tire, the marking assembly comprising:

(a) a marker adapted to selectively apply a mark to the tire at a selected position thereon;

(b) a positioning assembly in communication with the process controller, wherein said marker is supported on said positioning assembly, wherein said positioning assembly is adapted to move said marker to said selected position upon receiving a signal from the process controller and wherein said marker is adapted to apply a mark upon receiving a signal from the process controller; and (c) wherein the positioning assembly includes a first actuator adjacent the uniformity machine having a first axis, a second actuator operatively attached to the first actuator having a second axis substantially perpendicular to the first axis.

5. The marking assembly of claim 4 wherein the marker is supported on to the second actuator.

6. The marking assembly of claim 5 wherein the marker includes a hot stamp marker moveably mounted on the second actuator; and a means for moving the hot stamp marker into contact with the tire adjacent the hot stamp marker.

7. The marking assembly of claim 6 wherein the means for moving the hot stamp marker includes an air cylinder.

8. A marking assembly, in a tire uniformity machine having a process controller wherein the machine receives a test tire, the marking assembly comprising a positioning assembly located operatively with respect to the tire; and a first marker operatively located with respect to the tire and a second marker opposite the first marker in similar relation to the tire, whereby upon receiving a signal from the process controller, the positioning assembly locates the first and second markers on either side of the tire for applying a pair of marks thereto.

9. The marking assembly of claim 8 wherein the positioning assembly includes a first actuator having a first axis and a second actuator having a second axis generally perpendicular to the first axis.

10. The marking assembly of claim 9 wherein the second actuator is operatively attached to the first actuator and wherein the first and second markers are supported on the second actuator.

11. The marking assembly of claim 10 wherein the first and second actuators are linear tables.

12. The marking assembly of claim 9 further comprising a third actuator having a third axis generally parallel to the second axis, wherein the first marker is attached to the second actuator and the second marker is attached to the third actuator.

13. The marking assembly of claim 12 wherein the actuators are linear tables and wherein the markers are hot stamp markers.

14. The marking assembly of claim 8 wherein the positioning assembly is at least partially attached to the tire uniformity machine.

\* \* \* \* \*